United States Patent [19]

Hjertholm

[11] Patent Number: 5,181,730
[45] Date of Patent: Jan. 26, 1993

[54] SEALING SYSTEM FOR ABUTTING TUBE ENDS IN A PIPE CONDUIT

[75] Inventor: Ole G. Hjertholm, Kokstad, Norway

[73] Assignee: Friele Trading A/S, Nesttun, Norway

[21] Appl. No.: 687,873

[22] PCT Filed: Dec. 14, 1989

[86] PCT No.: PCT/NO89/00131
§ 371 Date: May 30, 1991
§ 102(e) Date: May 30, 1991

[87] PCT Pub. No.: WO90/07627
PCT Pub. Date: Jul. 12, 1990

[30] Foreign Application Priority Data

Dec. 27, 1988 [NO] Norway .................. 885759

[51] Int. Cl.$^5$ .................................. F16J 15/08
[52] U.S. Cl. .................. 277/167.5; 277/171; 277/207 A; 277/236; 285/917
[58] Field of Search .......... 277/1, 167.5, 168, 171, 277/181, 189, 207 A, 236; 285/321, 340, 108, 363, 917, 921, 922

[56] References Cited

U.S. PATENT DOCUMENTS

| | | | |
|---|---|---|---|
| 1,821,863 | 9/1931 | Wilson | 285/363 X |
| 1,821,865 | 9/1931 | Wilson | 285/363 X |
| 1,821,867 | 9/1931 | Wilson | 285/363 X |
| 1,873,855 | 8/1932 | Wilson | 285/917 X |
| 1,896,795 | 2/1933 | Kendall | 285/363 X |
| 2,208,353 | 7/1940 | Wooley et al. | 285/108 |
| 2,257,213 | 9/1941 | Wolfren | 277/167.5 X |
| 2,552,750 | 5/1951 | Thornhill | 277/167.5 |
| 2,898,000 | 8/1959 | Hanny | 277/167.5 |
| 3,078,110 | 2/1963 | Starr | 285/363 X |
| 3,155,401 | 11/1964 | Musolf | |
| 3,350,103 | 10/1967 | Ahlstone | 277/167.5 X |
| 3,468,559 | 9/1969 | Ahlstone | |
| 3,618,989 | 11/1971 | Ito | 285/917 X |
| 4,057,267 | 11/1977 | Jansen | |
| 4,168,853 | 9/1979 | Ahlstone | 285/363 X |
| 4,200,312 | 4/1980 | Watkins | 285/920 X |
| 4,474,381 | 10/1984 | Wilkins et al. | 285/334.2 X |
| 4,819,973 | 4/1989 | Pegon | 285/340 X |
| 5,103,915 | 4/1992 | Sweeney et al. | 277/236 X |

FOREIGN PATENT DOCUMENTS

| | | | |
|---|---|---|---|
| 1962053 | 6/1970 | Fed. Rep. of Germany | 277/167.5 |
| 3103551 | 9/1986 | Fed. Rep. of Germany | |
| 46-35801 | 10/1971 | Japan | 227/167.5 |
| 87/06645 | 11/1987 | PCT Int'l Appl. | |
| 2233406 | 1/1991 | United Kingdom | 277/236 |

OTHER PUBLICATIONS

"The Gasket": publ. by Goetee Gasket and Packing Co.; Nov. 1944, see Style P gasket.
H. Hugo Buchter, Industrial Sealing Technology, PP. 40–53, John Wyley & Sons.

Primary Examiner—William A. Cuchlinski, Jr.
Assistant Examiner—Scott W. Cummings
Attorney, Agent, or Firm—Francis C. Hand

[57] ABSTRACT

The sealing system employs a metal sealing ring having tapered surfaces which are able to slide along tapered sealing surfaces of the pipe forming members in the event of an axial movement of the pipe forming members away from each other, for example under a back fire situation. The metal sealing ring maintains effective sealing pressure and the sealing surfaces of the pipe forming members define an angle therebetween of from 30° to 50°. The sealing ring is made of highly elastic rust-free steel and is of wedge shape.

20 Claims, 2 Drawing Sheets

SEALING SYSTEM FOR ABUTTING TUBE ENDS IN A PIPE CONDUIT

The present invention relates to a system for establishing a sealing connection between two axially impacting members in a pipe conduit.

Heretofore, various types of rapid couplings have been known, for example rapid couplings of a type as disclosed in Norwegian Patent Application No. 861655, where a number (for example 9 peripheral mutually separated) of hydraulic or pneumatic cylinders with associated locking bolts fix a socket member via locking grooves to an insert member. In the known construction, nine locking bolts are proposed to be used, but in practice there can be employed a larger or smaller number of bolts than proposed. Instead of locking bolts, it is also possible to use segments, for example segments which are each controlled by one or two hydraulic or pneumatic cylinders. The purpose of the segments is to increase the abutment surface for transferring a prestressing force and distributing the forces as uniformly as possible over the whole periphery.

In connection with boring of oil wells, a significant static weight loading occurs on the pipe conduit and its couplings, partly as a consequence of the weight of the pipe conduit itself and partly as a consequence of the medium pressure from linear material which is received in the pipe conduit between the pipe conduit itself and the drill stem. From time to time, sudden changes occur in the medium pressure in the pipe conduit, produced by back fire or so-called "kick", for example due to the bore intruding into a gas pocket and being exposed to a momentary pressure build up. These back pressures can be relieved in a by-pass and/or an exhaust safeguard, but before this can occur a considerable axial tension loading is produced in the members of the two different couplings. The tension loadings can in certain instances, produce significant problems, for example in the occurrence of intermittent openings of the joint between the two axially impacting members in the coupling and from this follows momentary leakage under particularly high pressure Various types of sealing arrangements have also been known for sealing two abutting tube ends together in pipe conduits For example, U.S. Pat. No. 4,200,312 describes a sealing system for pipe conduits which is dependent upon different sealing arrangements in order to ensure sealing under different operative conditions.

U.S. Pat. No. 1,821,863 describes the use of an elastic metal sealing ring which is intended to provide a sealing effect by the high elasticity of the ring. However, specific types of metal and metallic properties are not described.

Accordingly, it is an object of the invention to provide a relatively simple sealing arrangement between two abutting tube ends in a pipe conduit.

It is another object of the invention to provide a reliable seal between two pipe-forming members of a coupling connection.

It is another object of the invention to provide a simple and reliable seal between two pipe forming members of a well head.

Briefly, the invention provides a sealing arrangement formed by a pair of pipe-forming members and a metal sealing ring disposed in sealing relation between the two pipe-forming members. The pipe-forming members are disposed in axial relation with each having an inner surface coextensive with an inner surface of the other member, a tapered sealing surface facing the tapered sealing surface of the other member and a support surface abutting the support surface of the other member.

The metal sealing ring is provided with an inner annular surface coextensive with the inner surfaces of the pipe-forming members, a pair of tapered sealing surfaces in sealing contact with the sealing surfaces of the pipe-forming members and an outer annular surface spaced radially inwardly of the abutting support surfaces of the pipe-forming members.

The arrangement of the sealing surfaces of the sealing ring and the pipe-forming members is such that upon axial movement of the pipe-forming members away from each other, for example under a back fire, the sealing surfaces of the ring slide along the sealing surfaces of the pipe-forming members while maintaining sealing contact therebetween throughout the radial width of the ring. In this respect, each sealing surface of the ring has a width less than the width of the sealing surface of a respective pipe-forming member.

The sealing ring is made of a highly elastic rust-free steel such as ASSI 410 rust-free steel. In addition, the tapered sealing surfaces of the pipe-forming members define an angle of from 30° to 50° and, preferably, an angle of 45° therebetween.

The sealing arrangement is incorporated into a coupling connection which also includes a plurality of locking means disposed about the pipe-forming members for releasably locking these members together while imposing a predetermined pressure force on the abutting support surfaces and across the sealing ring. In this respect, each locking means is mounted on one of the pipe-forming members and includes a slidably mounted bolt portion having an obliquely directed locking surface while the other pipe-forming member has an annular groove having an obliquely directed surface mating with the locking surface of the bolt portion of each locking means.

The predetermined pressure force which is developed by the locking means across the sealing ring is to be less than the elastic limit of the material of the sealing ring in order to permit the sealing ring to radially expand and contract under normal operating pressures of a medium flowing through the pipe-forming members and to permit the sealing ring to elastically deform beyond a yield point thereof under a back fire-produced high pressure in the medium flowing through the pipe-forming members. For example, the predetermined pressure force may be from 15% to 30% of the yield point of the sealing ring.

During operation, the elastically yielding metal sealing ring serves to ensure sealing of the pipe conduit under relatively low as well as under exceptionally high pressures of the medium flowing through the pipe conduit. The seal also serves to ensure sealing under particularly high intermittently occurring pressures in the medium which cause axial movement of the members relative to each other and which have a tendency to open a joint between the members where the metal sealing ring is arranged.

The coupling connection provided by the invention may also be used with advantage in other types of couplings such as so-called "hub" couplings where a head portion on two axially abutting members are coupled together by means of a pair of semi-circular collar-like clamping means which are clamped together in the peripheral direction by means of transverse bolts. A second example of an alternative coupling includes API flanges or clamp flanges which are clamped together by means of a plurality of from 20 to 24 axially extending bolts.

The system is characterized in that the sealing ring is made of highly elastic rust-free steel and in and in that the sealing surfaces of the members converge towards each other in a direction radially outwards in the pipe conduit at an angle of from 30° to 50°. The system is also characterized in that the sealing ring-receiving groove of the members is provided radially innermost at the largest wedge truncated end surface with combined control and stop means for the sealing ring so as to prevent displacement of the sealing ring radially inwards into the pipe conduit from a pressure relieved starting position. Further, the groove provided radially outermost at the smallest wedge truncated end surface of the sealing ring is provided with a radially outer expansion chamber designed for the reception of a radially expanded sealing ring. Still further, the sealing surfaces of the members, which have a somewhat longer longitudinal dimension than the sealing surfaces of the sealing ring, are extended inwardly into the expansion chamber, and that the prestressing force is substantially limited to a set, controlled clamping force which is exerted via the sealing ring exclusively via its sealing surfaces.

The present invention further relates to a process for establishing a sealing connection between two axially impacting members in a pipe conduit which operates with a medium which is subjected to high medium pressures and which intermittently can be subjected to occasionally occurring, particularly high media pressures which cause axial extending of the members and thus the axial opening of a joint between the members. The sealing connection effects endwise clamping together of the members after an elastically yielding metal sealing ring is inserted in the joint between the members. The sealing ring, which is wedge truncated, is inserted with two mutually opposite sealing surfaces facing towards their respective sealing surface in the joint between the two members and with one end surface of the sealing ring facing towards the interior of the pipe conduit The process is characterized in that the sealing ring is placed in the joint between the members, concentrically to them, with its one, radially inner end surface in precise alignment with the inner surface of the pipe conduit and with its other radially outer end surface at a certain radial distance from an end wall in an extension chamber radially outside the sealing ring. Thereafter, the sealing ring is fixed between the members with a prestressing force which is sufficient to establish a sealing abutment between the sealing surfaces of the sealing ring and the sealing surfaces of the members, when conventional medium pressures prevail in the pipe conduit, but which is substantially lower than the tension loading which can occur in the members, when particularly high medium pressures prevail in the pipe conduit. The sealing ring which is subjected to the medium pressure which prevails in the pipe conduit via one end surface is elastically deformably moved with the occasional occurrence of particularly high medium pressures, radially along the sealing surfaces of the members, to compensate for an intermittent opening of the joint between the members.

By placing the highly elastic wedge-truncated sealing ring in connection with an extension chamber in the joint between the members, the sealing ring is given a possibility, under specific conditions with particularly high media pressures, to expand itself radially in the expansion chamber. This is of interest under conditions where the media pressure causes such a strong extending of the members that the joint between these is opened axially, the wedge-truncated sealing ring thereby being able to wedge itself radially outwards and compensate for the mutual axial displacement of the sealing surfaces of the joint.

By prestressing the coupling with a significant force during mounting, one can ensure that an effective sealing abutment is maintained between the sealing ring and members of the pipe conduit in a lower pressure zone where the pressure tops are moderate, that is to say where the prestressing force between the members exceeds occurring tension force which are momentarily supplied between the members as a consequence of momentary pressure medium increases. In an upper pressure zone, where the tension forces exceed the prestressing force, one has simultaneously ensured by means of the prestressing force that the medium pressure becomes immediately effective against the elasticity effect in the sealing ring when the force from the medium pressure exceeds the prestressing force. Thereby the medium pressure can momentarily give the desired radial expansion of the sealing ring immediately there occurs a need for this.

The sealing ring is prestressed with a clamping force which constitutes from 15 to 30% and preferably about 20% of the force which determines the yield point of the material of the sealing ring.

According to the invention it is of great significance that the prestressing force is of an established magnitude, that is to say sufficiently large so as to be able to ensure sealing between the members before the members begin to move relative to each other, but at the same time not larger than practically necessary. In other words, the aim is that the sealing ring can be actuated in different ways in different pressure media zones.

In this way, one obtains a first, lower pressure medium zone with moderate pressures, where the prestressing force ensures sealing via the sealing ring without substantial elastic deformation of the sealing ring. Furthermore, one obtains a subsequent, second, upper pressure medium zone with significant pressure, where the prestressing force is overcome and where the elasticity movements of the sealing ring get free flow after a prior pressure build up. At the top of this second, upper pressure zone, the occurrence of exceptionally high pressures will produce loads on the sealing ring which can exceed the yield point of the material of the sealing ring.

The steel sealing ring is made of a metal but has a specific degree of hardness, a high yield point and simultaneously a particularly high elasticity.

According to the invention, the most favorable effects are achieved by making the sealing ring of ASSI 410 rust-free steel. But other types of highly elastic, rust-free steel can also be of interest.

It is preferred that the sealing ring is made of ASSI 410 rust-free steel, which initially has a degree of hardness of 24 Rockwell and which is heat treated at temperatures of between about 1000° C. (960° C.) and about 500° C. (600° C.) during maintenance of the original yield point of the material at the same time as the degree of hardness of the material is changed to between 18 and 20 Rockwell.

By this, one can ensure that high elasticity and high yield point are obtained and simultaneously a desired degree of hardness which is suited for the purpose. In this way, a sealing ring is obtained having a relatively large inherent rigidity. Such a sealing ring will be particularly suited to momentarily occurring, radially acting, elastic expansion movements, where the sealing ring has the ability to return back to the starting position, even with occasionally occurring, particularly high medium pressures, which otherwise could have caused the yield point of the material to be exceeded. In case the pressures which occur in the pipe conduit result in the yield point of the material being exceeded, the sealing ring is unusable for further sealing, when the high pressures decline again to a more normal operative pressure.

Further features of the present invention will be evident from the following description have regard to the accompanying drawings, in which.

Figure 1:
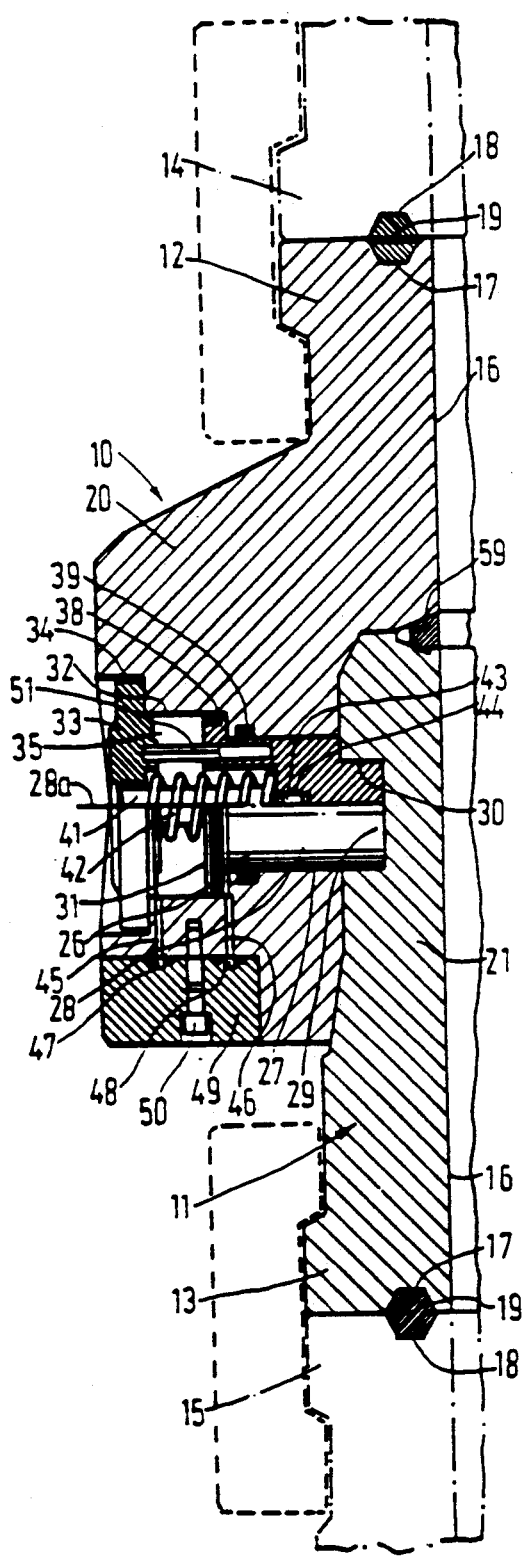
FIG. 1 shows a sealing connection according to the invention shown in vertical section and shown with a locking means in an active locking position.

In FIG. 1, there is shown a rapid coupling connection between two pipe-forming members 10 and 11, which form a part of their respective pipe conduit section, pipe valve or similar pipe-forming equipment in the pipe conduit for use in well boring operations in connection with gas or oil deposits.

The members 10 and 11 are provided at mutually opposite ends with coupling portions 12 and 13 of the "hub" type connection, which cooperate with equivalent coupling portions 14 and 15 (shown in broken lines) in their respective adjacent pipe conduit section. Between the coupling portions 12, 14 and between the coupling portions 13, 15 there are shown at a distance radially inside the inner surface 16 of the pipe conduit, opposed cavities 17, 18 for the reception of their respective sealing ring 19 or known construction per se. By means of two collar-forming, annular half member-formed tension means (shown by broken lines) the coupling portions 12, 14 and 13, 15 can be locked together in more or less permanent connections by means of transverse bolts (not shown).

Alternatively there can be employed, for a more or less permanent connection, a second type of coupling connection, for example a clamp flange coupling with an associated series of axially extending fastening bolts.

In contrast to the more or less permanent connections, the members 10 and 11 shall form a part of a rapid coupling connection, that is to say a connection which is adapted to be closed and opened far more often than the more or less permanent connection. The one member 10 in the rapid coupling connection is provided with a socket portion 20 which cooperates with an insert portion 21 on the second member 11 in the rapid coupling connection.

The socket portion 20 is provided with an internal cavity 20a which axially outermost is provided with a conically tapered first, internal guide surface 22. The guide surface 22 extends directly over into a cylindrical, axially extending, internal support surface 23, which continues into a conically tapered, second, internal guide surface 24. Axially innermost, the guide surface 24 extends over into a radially extending, internal support surface 25 which forms a vital inner joint surface for the member 20.

The insert portion 21 is provided with equivalent external guide surfaces 22a and 24a together with equivalent external support surfaces 23a and 25a, so that the members 10, 11 in a fully pushed together condition close relatively tightly together, radially as well as axially.

In the following description there shall be described in particular rapid coupling for the members 10 and 11.

In the socket portion 20, there are installed at suitable peripheral distances a number of locking means 26 for example pine locking means 26 in their respective radially extending bores 27. Each locking means 26 is provided with a radially inner, cylindrical stem portion 28, having a radially innermost bolt portion 29. Relative to the cylindrical peripheral surface of the stem potion 28, the bolt portion 29 is provided with a locally offset, transverse locking surface 30, which extends somewhat obliquely inwards relative to a radial plane through the center axis 28a of the stem portion 28. The locking surface 30 is localized to the upper (shown in FIG. 1 and 2) section of the bolt portion 29, the lower section of the bolt portion 29 being designed with a cylindrically shaped periphery correspondingly as the locking means 26 remaining. The locking means 26 is provided at the opposite end, relative to the pipe conduit with a radially outer piston 31 which is movable in a bore 32. A cover 33, which is received in an outermost bore 34 in the socket portion 20, together with the piston 31, defines a first working chamber 35 in the bore 32, there being formed an opposite second working chamber 36 in the bore 32 between the piston 31 and the inner wall 37 of the bore 32. A first packing 38 is provided in the piston 31 and a second packing 39 in the bore 27 for sealing off of the second working chamber.

Figure 2:
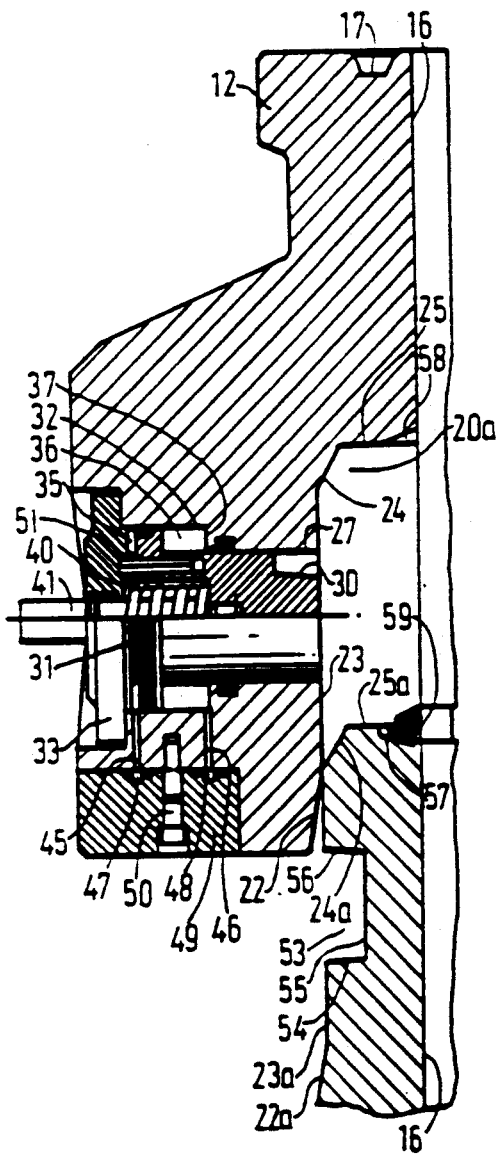
FIG. 2 shows the same as in FIG. 1 with the locking means in an inactive position.

Through the cover 33 and through the working chamber 35 and inwardly into a bore 40 in the locking means there extends a control bar 41 which is surrounded by a helical spring 42. As shown in FIG. 2, the control bar 41 indicates in a pushed out condition that the locking means occupies its drawn back inactive position. The control bar 41 is provided at its free end with a fastening pin 43 which is received in a fastening 44 in the locking means 26.

In FIG. 1 the locking means is shown in an active locking position. In order to adjust the locking means in the active locking position, compressed air (or pressure oil) is supplied to the working chamber 35 via a first control duct 45, while pressure is discharged in the working chamber 36 via a second control duct 46. The ducts 45 and 46 communicate with their respective ducts 47 and 48 in a connecting piece 49 which is secured to the socket portion 20 of the member 10 by means of fastening screws 50 (only one is shown in the drawing). The ducts 47 and 48 communicate with respective ducts 45 and 46 for each of the locking means 26, so that these can be moved in step with each other from and to the locking position (shown in FIG. 2) by means of a single pressure activating means or by reversing the pressure in the ducts 47 and 48. The cover 33 is fastened with a number of fastening screws (not shown) directly to the socket portion 20 of the member 10 and by means of an eccentrically arranged bore 52 in the piston 31. By means of the helical spring 42, one can ensure that the locking means 26 is held in place in the locking engagement position, even if the pressure should be discharged for one reason o another from the piston 31 of the locking means 26. Correspondingly, the helical spring 42 will be compressed and charged by a pneumatic or hydraulic readjustment of the locking means from the active locking position to the inactive rest position.

The insert portion 21 is provided with an annular groove 53 which is adapted to receive the bolt portion 29 of the looking means 26 at arbitrary locations along the groove 53. The groove 53 is provided as shown in FIG. 1 and 2 with a radially extending first side surface 54, an axially extending bottom surface 55 and a second side surface 56 which extends parallel to the locking surface 30 on the bolt portion 29 of the locking means 26. Oblique surface 30 of the locking means 26 has an angle which lies within the self-locking principle that is to say which has an angle w of up to 8° and preferably of an order of magnitude of 3°-6°. The aim is abutment between the bolt portion 29 and the groove 53 only occurring via the mutually parallel surfaces 30 and 56, the remaining surfaces of the bolt portion 29 and the groove 53 being without contact with each other. By this, one can transfer the prestressing force in a controlled manner from the surface 30 of the bolt portion 2 to the surface 56 of the groove 53. It will be evident from FIG. 1 and 2 that the bolt portion 29 can be led into position in a self-controlling manner by guiding the locking surface 30 along the side surface 56 of the groove 53 until the cylindrical surface of the locking means impacts against the opposite side surface 54 of the groove. In the position illustrated in FIG. 1, the locking means 26 are pushed into place in the groove 53 with a precisely adapted pressure loading which presses the members 10 and 11 mutually axially together with a pressure force of for example 94 tone across an intermediate sealing ring 59.

In the joint between the socket portion 20 and the insert portion 21, there are designed opposite cavities 57 and 58, which in a common, triangular hollow space receive the intermediate sealing ring in the form of a wedge-truncated sealing ring 59 i.e. a highly elastic sealing ring of rust-free steel, more specifically of a material of the type ASSI 410. The sealing ring is certified for DIN 50049.3.1G. Initially the forged sealing ring has a degree of hardness of 24 Rockwell, but by subjecting the sealing ring to a special heat treatment, the sealing ring is provided with a degree of hardness of 18 minimum and 20 maximum Rockwell, in order to guarantee the ring suitable sealing properties and suitable rigidity for the purpose. The special heat treatment ensures that at the same time as one preserves a desired high yield point and desired high elastic properties, a desired degree of hardness is also provided. For example, as regards a sealing ring with an inner diameter of 18 inches (45.7 centimeters) one has heat treated the forged sealing ring at a specific temperature over the course of a specific time period and thereafter effected cooling over a specific time period (such as recommended by the supplier Firth Rixson plc, Woodhouse & Rixson Works, Bessemer Road, Sheffield S93Xs, Great Britain). More specifically, one has effected a heat treatment of the sealing ring at a temperature of 960° C. with cooling (quenching) in an oil bath over 3 hours. Thereafter, the sealing ring is air cooled at a temperature of 700° C. over 8 hours in order thereafter to be air cooled at a temperature of 660° C. over 6 hours. As regards heat treatment and subsequent cooling of the sealing rings of greater or smaller diameter, corresponding temperatures are employed, but different times all according to the quantity of material of the sealing ring in the individual instance. In practice, however, other types of highly elastic sealing rings of rust-free steel can also be used (without specific embodiments of this being disclosed), even if the afore-mentioned type, which has particularly high elasticity and which can be worked extra for totally special physical properties, will be preferred.

The cavities 57 and 58 are designed just by the inner surface of the pipe conduit, so that one largest end surface 60 of the sealing ring 59 is in alignment with the inner surface 16 of the pipe conduit under normal operative conditions.

Figure 3:
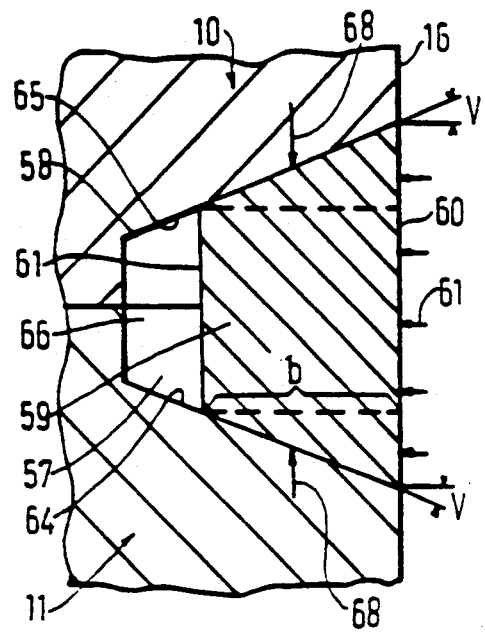
FIG. 3 shows schematically a vertical section of a sealing ring according to the invention under normal use conditions.
Figure 4:
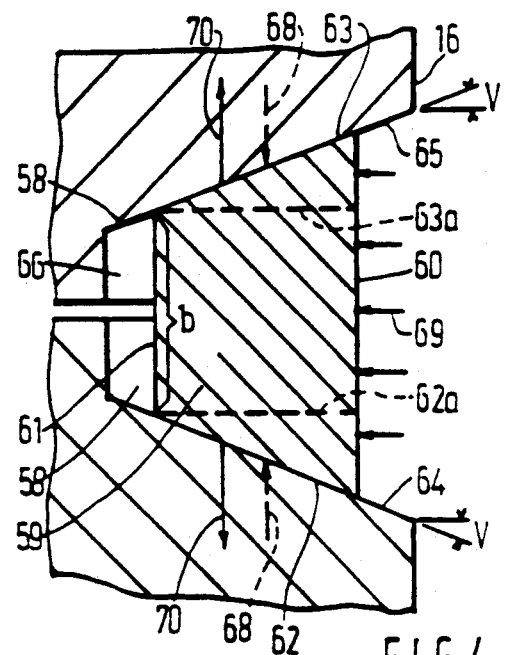
FIG. 4 shows in a corresponding section to FIG. 3 the sealing ring under conditions with the occurrence of the particularly high medium pressures.

In FIG. 3 and 4, there is schematically illustrated a principle for the mode of action of the sealing ring 59. The sealing ring 59 is shown with a largest surface in the form of one annular end surface 60 and a smallest surface in the form of an oppositely lying annular end surface 61. Between the surfaces 60 and 61 extend two sealing surfaces 62 and 63 converging towards each other, which in the illustrated embodiment extend at an angle v of about 20° relative to the radial joint surface between the members 10 and 11. Alternatively, the angle can be of the order of magnitude of 15°-25°. The height of the end surface 61 corresponds substantially to the distance b between the surfaces 60 and 61. By this there is obtained by means of an approximately square cross-sectional area (defined within the broken lines 62a,62a) relatively large form stability and minimal local deformation of the sealing ring under various, occurring medium pressures in the pipe conduit. The sealing surfaces 64 and 65 of the cavities 57 and 58, which run parallel to the sealing surfaces 62, 63 of the sealing ring 59 have somewhat larger dimension (for example 3-4 mm greater length), reckoned relative to the radial dimension of the joint, than the sealing surfaces 62 and 63. Consequently, there is formed radially outside the sealing ring, an outer expansion chamber 66, in which the sealing ring can be received by an elastic deformation of the sealing ring.

In FIG. 3, there is illustrated the placing of the sealing ring 59 in the joint between the members 10 and 11 when normal medium pressure conditions prevail in the pipe conduit. The members 10, 11 form a part of a pipe conduit with an internal diameter of 77 cm (30.5 inches). Conventional pipe diameters of interest for the present purposes usually lie in the order of magnitude of 6 to 78 cm (2 inches to 31 inches), but it can also be of interest with smaller as well as larger pipe diameters where there must be a need for this.

There are indicated in FIG. 3 with vector arrows 67 moderate medium pressures of for example up to 14 kp/cm$^2$ (200 psi) under normal operative conditions for a pipe conduit with 77 cm internal diameter. There is employed a prestressing force as indicated by vector arrows 68 between the members 10 and 11 across the sealing ring 59 of for example 42 kp/cm$^2$ (600 psi) and correspondingly a combined pressure between the members of about 30 ton for a pipe conduit with an internal diameter of 77 cm. Under normal operative conditions with medium pressures of close to 14 kp/cm², and even with relatively high medium pressures of close to 42 kp/cm² the prestressing force will, as shown by the vector arrows 69, be able to maintain an effective sealing pressure between the members 10, 11 and the sealing ring 59 without elastic deformation of the sealing ring being produced.

At particularly high, intermittently occurring medium pressures in the pipe conduit, that is to say at medium pressures which exceed the prestressing loading (about 30 ton) between the members 10, 11, but which fall short of the elasticity limit for the material of the sealing ring, the pipe conduit will be subjected to momentary, axial tension loadings within the elasticity limits of the sealing material. The particularly high medium pressures are shown in FIG. 4 with vector arrows 70 towards the radially inner end surface 60 of the sealing ring 59, while the accompanying axial tension forces are indicated by vector arrows and for example are of an order of magnitude of 470 ton. The result is that the members can be intermittently drawn from each other—reckoned across the joint between radial support surfaces of the members—a distance of for example 1.4 millimeters. Because of the highly elastic material in the sealing ring, as a consequence of the high medium pressure which occurs in the pipe conduit, the sealing ring can be extended for example 2 millimeters of the ring in the radial direction. The radial extending follows from the occurring medium pressures which act against the radially inner surface 60 of the sealing ring. The radial extending of the sealing ring occurs at the same time as the sealing surfaces 62, 63 of the sealing ring slide a corresponding distance along the sealing surfaces 64, 65 of the members 10, 11 to the position which is shown in FIG. 4. By this, the sealing surfaces 62, 63 extend wedge-shaped inwardly between equivalent, mutually converging sealing surfaces 64, 65 of the members 10, 11 and fill out the intermediate space between the sealing surfaces 62, 64 and 63, 65 gradually as the sealing surfaces 64, 65 are drawn axially away from each other.

As a consequence of the inherent elasticity of the sealing ring, the sealing ring 59 will be placed back from the position shown in FIG. 4 to the position shown in FIG. 3, immediately the medium pressure in the pipe conduit falls back to the normal operative pressure. This means that the members 10, 11 are relieved of the occurring large axial pressures and again impact along mutually adjacent joint surfaces, while the sealing ring returns to the starting position in a full operatively ready condition and then with the original prestressing force intact between the members 10, 11.

If the intermittently occurring top loading substantially exceeds in an exceptional case the afore-mentioned top loading of 45 tons, for example rises to a top loading of 600 ton or higher, one enters into a zone where the loading of the sealing ring reaches up to the yield point of the material. In such a case, the sealing ring can be extended to the maximum outwardly into the cavities 57 and 58 and completely fills out the hollow space 66 radially outside the sealing ring 59. Instead of achieving an elastic return positioning of the sealing material to the starting position, when the medium pressure again falls back to the normal medium pressure, the elastic properties of the material will then disappear to a greater or smaller degree, so that the sealing ring in the continuation becomes unusable for the purpose and therefore must be replaced. In such a case, there is an advantage that the connection between the members 10 and 11 is formed by a rapid coupling.

Although the sealing system is only shown in connection with rapid coupling, it must be understood that the system can also be employed in connection with other couplings, for example in connection with the illustrated "hub" couplings or in connection with other couplings such as normal flange couplings with associated series of fastening bolts. In other words, it will also be possible to employ the same sealing principle as shown in the rapid coupling for the more or less permanent couplings. It will also be possible to design such alternative couplings with prestressing forces correspondingly as mentioned above. In such cases, a wedge-truncated sealing ring of highly elastically yielding, rust-free steel is employed in the joint between the axially impacting members and then with a possibility of movement of the sealing ring radially inwards into an extension chamber located radially just outside the sealing ring. If necessary, in such instances provision can also be made for the radially innermost surface of the sealing ring to then extend in alignment with the equivalent inner surface of the pipe conduit before prestressing is effected between the members correspondingly as described above.

Figure 5:
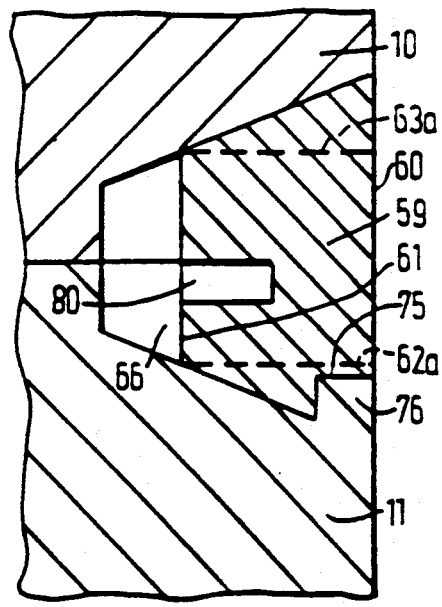
FIG. 5 illustrates a cross sectional view of a modified seal arrangement employing a stop for the sealing ring in accordance with the invention.

In order to ensure that the radially innermost surface of the sealing ring is automatically in alignment with the inner surface of the pipe conduit in each case, one can provide the sealing ring as shown in FIG. 5 with an annular, stopper-forming cavity 75 at one, internal edge portion of the sealing ring and provide the member 11 with an equivalent annular stop flange 76 at the equivalent, internal upper edge portion of the member 11.

Figure 6:
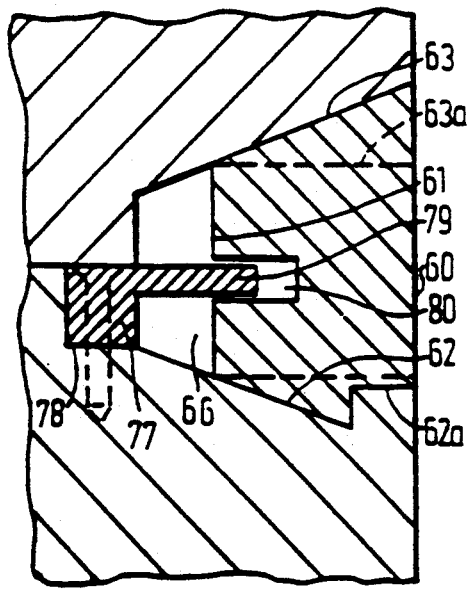
FIG. 6 illustrates a view similar to FIG. 5 of a sealing arrangement employing a locking member for the seal ring.

In order to ensure that the sealing ring 59 is held securely in position on the member 11 during mounting and dismounting of the member 10 in engagement with the member 11, there are fixed for example with a 120° mutual intermediate spacing three locking members 77 (only the one is shown in FIG. 6) to the member 11 for securing the sealing ring 59 in the intended precise position on the member 11. The locking member 77 is received in a cavity 78 in the member 11 radially just outside the hollow space 66 and projects with a locking stem 79 radially inwards into an annular groove 80 along the periphery of the sealing member 59. The annular groove 80, which projects radially inwards into the sealing member 59, has sufficient depth to be able to secure the sealing ring axially on the member 11 at the same time as the sealing ring is permitted to be moved radially between the positions as illustrated in FIGS. 3 and 4.

The invention thus provides a sealing arrangement which provides a reliable seal between two abutting pipe forming members under normal operating conditions of a pressure medium flowing through the pipe forming members as well as during an exceptionally high increase in pressure in the medium such as caused by a back fire.

I claim:
1. In combination
  a pair of pipe-forming members disposed in axial relation, each of said members having an inner surface coextensive with an inner surface of the other of said members, a tapered sealing surface facing said tapered sealing surface of the other of said members, and a support surface abutting said support surface of the other of said members; and a metal sealing ring disposed in sealing relation between said members, said sealing ring having an inner annular surface coextensive with said inner surfaces of said members, a pair of tapered sealing surfaces in sealing contact with said respective sealing surfaces of said members and an outer annular surface spaced radially inwardly of said abutting support surfaces whereby upon axial movement of said members away from each other, said sealing surfaces of said ring slide along said sealing surfaces of said members while maintaining sealing contact therebetween throughout the radial width of said ring.

2. The combination as set forth in claim 1 wherein each sealing surface of said ring has a width less than the width of said sealing surface of a respective member.

3. The combination as set forth in claim 1 wherein said ring is made of a highly elastic rust-free steel.

4. The combination as set forth in claim 3 wherein said ring is made of ASSI 410 rust-free steel.

5. The combination as set forth in claim 4 wherein said ring has a degree of heat-treated hardness of between 18 to 20 Rockwell.

6. The combination as set forth in claim 1 wherein said tapered sealing surfaces of said members define an angle of from 30° to 50° therebetween.

7. The combination as set forth in claim 1 wherein said tapered sealing surfaces of said members define an angle of from 30° to 50° therebetween.

8. The combination as set forth in claim 1 wherein said sealing ring has an annular groove in said outer annular surface and which further comprises a plurality of locking members in one of said pipe-forming members extending into said groove to secure said ring in said one pipe-forming member.

9. The combination as set forth in claim 1 which further comprises a plurality of locking means disposed about said members for releasably locking said members together while imposing a predetermined pressure force across said sealing ring.

10. The combination as set forth in claim 9 wherein each said locking means is mounted in one of said members and includes a slidably mounted bolt portion having an obliquely directed locking surface and the other of said members has an annular groove having an obliquely directed surface mating with said locking surface of said bolt portion of each locking means.

11. The combination as set forth in claim 9 wherein said predetermined pressure force across said ring is less than the elastic limit of the material of said sealing ring to permit said sealing ring to radially expand and contract under normal operating pressures of a medium flowing through said members and to permit said sealing ring to elastically deform beyond a yield point thereof under a back fire produced high pressure.

12. The combination as set forth in claim 11 wherein said predetermined pressure force is from 15% to 30% of said yield point of said sealing ring.

13. The combination as set forth in claim 9 which further comprises a common pressure source for actuating each locking means to produce a combined pressure force of the order of 20 tons.

14. A coupling connection for a pipe conduit comprising a pair of pipe-forming members, each member having a support surface abutting said support surface of the other of said members and a tapered sealing surface facing said tapered sealing surface of the other of said members;

a plurality of locking means disposed about said members for releasably locking said members together while imposing a predetermined pressure force on said abutting support surfaces; and a metal sealing ring disposed in sealing relation between said sealing surfaces of said members, said sealing ring having a pair of tapered sealing surfaces in sealing contact with said respective sealing surfaces of said members, whereby upon axial movement of said members away from each other, said sealing surfaces of said ring slide along said sealing surfaces of said members while maintaining sealing contact therebetween throughout the radial width of said ring.

15. A coupling connection as set forth in claim 14 wherein each sealing surface of said ring has a width less than the width of said sealing surface of a respective member.

16. A coupling connection as set forth in claim 14 wherein said ring is made of ASSI 410 rust-free steel.

17. A coupling connection as set forth in claim 14 wherein said tapered sealing surfaces of said members define an angle of from 30° to 50° therebetween.

18. A coupling connection as set forth in claim 14 wherein said tapered sealing surfaces of said members define an angle of 45° therebetween.

19. A coupling connection as set forth in claim 15 wherein each said locking means is mounted in one of said members and includes a slidably mounted bolt portion having an obliquely directed locking surface and the other of said members has an annular groove having an obliquely directed surface mating with said locking surface of said bolt portion of each locking means.

20. In combination a pair of pipe-forming members disposed in axial relation, each of said members having an inner surface coextensive with an inner surface of the other of said members, a tapered sealing surface facing said tapered sealing surface of the other of said members, and a support surface abutting said support surface of the other of said members; and a metal sealing ring disposed in sealing relation between said members, said sealing ring having an inner annular surface coextensive with said inner surfaces of said members, a pair of tapered sealing surfaces in sealing contact with said respective sealing surfaces of said members, said ring having an annular cavity at said inner annular surface to receive said stop therein, and an outer annular surface to receive said stop therein, and an outer annular surface spaced radially inwardly of said abutting support surfaces whereby upon axial movement of said members away from each other, said sealing surfaces of said ring slide along said sealing surfaces of said members while maintaining continuous sealing contact therebetween throughout the entire extend of said sealing surfaces.

* * * * *

UNITED STATES PATENT AND TRADEMARK OFFICE
CERTIFICATE OF CORRECTION

PATENT NO. : 5,181,730
DATED : January 26, 1993
INVENTOR(S) : Ole G. Hjertholm

It is certified that error appears in the above-identified patent and that said Letters Patent is hereby corrected as shown below:

Column 12, line 64 change "extend" to -extent-

Signed and Sealed this

Fourteenth Day of December, 1993

Attest:

BRUCE LEHMAN

Attesting Officer

Commissioner of Patents and Trademarks